United States Patent [19]
Kopp et al.

[11] Patent Number: 5,652,753
[45] Date of Patent: Jul. 29, 1997

[54] DIGITAL TELEPHONE

[75] Inventors: Dieter Kopp, Hemmingen; Peter Fesseler, Stuttgart, both of Germany

[73] Assignee: Alcatel N.V., Rijswijk, Netherlands

[21] Appl. No.: 560,840

[22] Filed: Nov. 20, 1995

[30] Foreign Application Priority Data

Dec. 24, 1994 [DE] Germany ................ 44 46 507.6

[51] Int. Cl.$^6$ .............. H04J 3/06; H04M 9/00; H04M 1/64
[52] U.S. Cl. .......... 370/489; 370/485; 370/904; 379/88; 379/67
[58] Field of Search ............... 379/67, 68, 73, 379/74, 77, 88, 89, 211, 212, 142; 370/60.1, 110.1, 489, 485, 904, 490

[56] References Cited

U.S. PATENT DOCUMENTS

| | | | |
|---|---|---|---|
| 4,723,273 | 2/1988 | Diesel et al. | 379/211 |
| 4,998,274 | 3/1991 | Ephraim | 379/158 |
| 5,062,133 | 10/1991 | Melrose | 379/94 |
| 5,155,760 | 10/1992 | Johnson et al. | 379/67 |
| 5,339,354 | 8/1994 | Becker et al. | 379/67 |
| 5,394,445 | 2/1995 | Ball et al. | 379/142 |
| 5,400,393 | 3/1995 | Knuth et al. | 379/88 |
| 5,432,844 | 7/1995 | Core et al. | 379/67 |
| 5,434,906 | 7/1995 | Robinson et al. | 379/67 |
| 5,453,986 | 9/1995 | Davis et al. | 379/202 |
| 5,483,577 | 1/1996 | Gulick | 379/67 |
| 5,550,900 | 8/1996 | Ensor et al. | 379/67 |

FOREIGN PATENT DOCUMENTS

| | | |
|---|---|---|
| 0567135 | 10/1993 | European Pat. Off. . |
| 0637158 | 2/1995 | European Pat. Off. . |
| 4207837 | 3/1992 | Germany . |
| 4228801 | 4/1993 | Germany . |
| 4136138 | 5/1993 | Germany . |
| 2032153 | 9/1979 | United Kingdom . |
| 9311643 | 6/1993 | WIPO . |

OTHER PUBLICATIONS

"32-Bit Technik für digitale Anrufbeantworter", O. Gautherot, *Funkschau* Feb. 1993, pp. 62–65.

"Doppelnutzen mit Zweikanaltelefonen", H. Blab et al, *Telecom Report*, vol. 14 (1991), No. 6, pp. 307–309.

"Der Bilinguale ISDN–Basisanschluss Was, warum, wie, wo, wann?", D. Cattarius, *Telecom Praxis* Nov. 1991, pp. 44–46.

"Nie mehr 'besetz'", R. Greve, Telecom Report, vol. 15 (1992), No. 2, pp. 72–75.

"Method for Automatically Leaving Messages on Answering Machines", *IBM Technical Disclosure Bulletin*, vol. 36, No. 8, Aug. 1993, p. 159.

"Alcatel 4610/Welsome your customers whenever they call", Alcatel Product Bulletin CA 4610 GB ABSI Apr. 1993.

*Primary Examiner*—Krista M. Zele
*Assistant Examiner*—Daniel S. Hunter
*Attorney, Agent, or Firm*—Ware, Fressola, Van Der Sluys & Adolphson LLP

[57] ABSTRACT

A low-cost implementation of a voice message system is indicated. To that end, a digital signal processor (DSP) and a second memory (ROM) with program modules for executing the functions of "automatic operator" and/or "mailbox" are integrated in a digital telephone (TE4). In addition, the digital telephone (TE4) is able to execute an "individual messages" function, whereby a message intended only for another telephone (TEA) is transmitted to this other telephone (TEA) by means of the digital telephone (TE4).

7 Claims, 4 Drawing Sheets

5,652,753

DIGITAL TELEPHONE

TECHNICAL FIELD

The present invention concerns a digital telephone with a connection to a communications network.

BACKGROUND OF THE INVENTION

Digital telephones are generally known and find multiple applications today.

The Alcatel 4610 voice information system is also known. The product description "Alcatel 4610, Welcome your customers whenever they call", CA 4610 GB ABSI-04/93 describes the possibilities offered by this voice information system. The voice information system is directly connected to a private branch exchange. The private branch exchange provides the connection to a public communications network. For a specified number of telephones connected to the private branch exchange, the voice message system makes available a "mailbox" assigned to each of these telephones. In addition, a central mailbox is provided. In this instance, mailbox means that a memory or a memory area is assigned to the telephones connected to the private branch exchange, so that the telephone user has a kind of telephone answering system available. The user can store an announcement and store messages from callers whose calls the user cannot accept. An "automatic operator" performs the switching function. It transmits an announcement to the caller, who e.g. has dialed the central telephone number, informing the caller how he can further be connected to the other telephones of the private branch exchange, and which persons/ divisions are assigned to these telephones. The "automatic operator" then makes the desired reconnection.

DISCLOSURE OF INVENTION

A disadvantage of this voice information system is that it represents an expensive solution for applications comprising only a few telephones. The task of this invention is to avoid the disadvantage of the state of the art in a technically simple manner.

According to the present invention, a digital telephone comprises an interface means for providing a connection with a link to a communications network, the link having at least one further digital telephone connected thereto, a first control means for controlling functions executable with the digital telephone, a first memory for storing speech, a digital signal processor, a second memory, and program modules stored in the second memory for executing a first function, "automatic operator", in which speech data is read from the first memory and transmitted over the communications network to another telephone having a separate link to the communications network, and in which in response to signaling information coming from the other telephone, the digital telephone initiates establishment of a call from the other telephone to the at least one further digital telephone, and/or said program modules executing a second function, "mailbox", in which a separate automatic answering mode is provided for both the digital telephone and the at least one further digital telephone.

It is advantageously possible to transmit a message to a caller, whose call is expected but cannot be answered by the called party.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
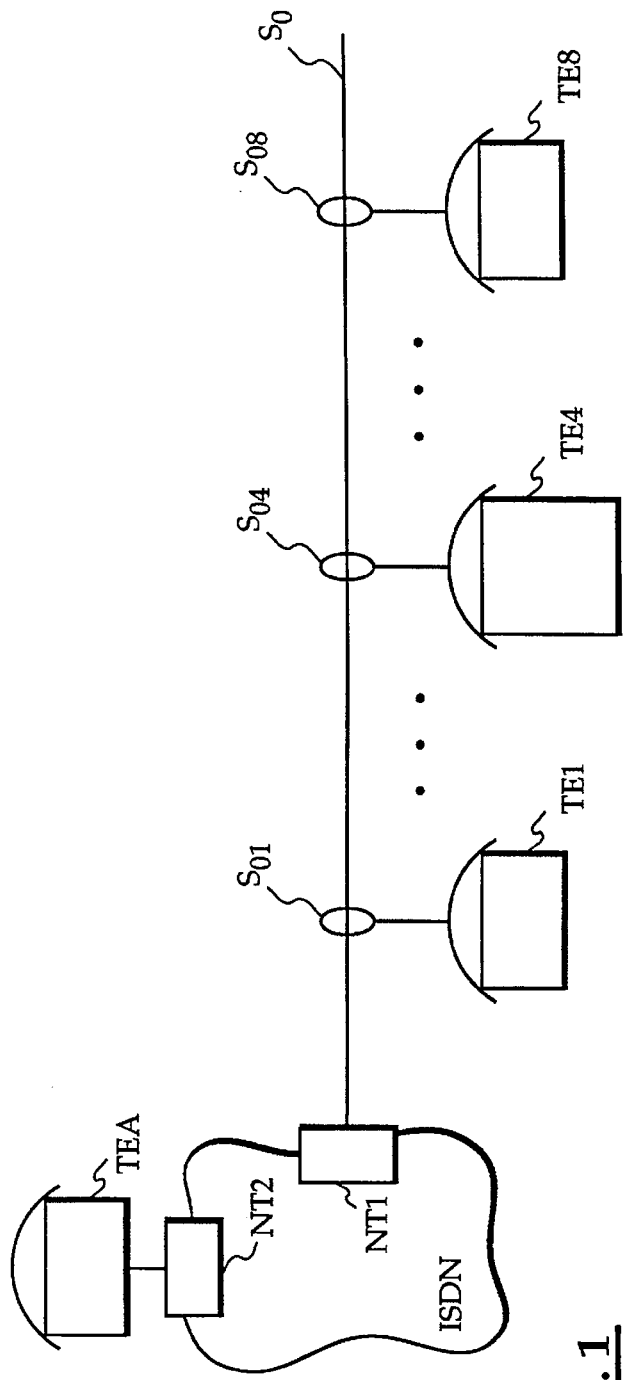
FIG. 1 is an example of a basic connection of an ISDN communications network, to which a digital telephone of the invention has been connected.

FIG. 1 depicts an ISDN (Integrated Services Digital Network)-standard communications network. Although the configuration examples describe a communications network according to the ISDN-standard, the invention should not be perceived as being limited thereto. It is also possible to utilize the digital telephone of the invention in other communication networks, in which the "automatic operator", "mailbox" or "individual messages" functions can be executed. In that case, the telephone of the invention must be adapted to the conditions of the communications network.

A basic ISDN connection, a so-called $S_0$ bus, is connected to a first network terminal NT1. Eight subscriber terminals TE1, ..., TE8 are connected to the $S_0$ bus via corresponding $S_0$ interfaces $S_{01}$, ..., $S_{08}$. The subscriber terminal TE4 is a digital telephone according to the invention. The service features of the $S_0$ bus can be used by the connected subscriber terminals, and particularly by the digital telephone TE4. The subscriber terminals TE1, ... TE8 can be dialed directly by means of the terminal dial numbers EAZ1, ..., EAZ8. The terminal dial number EAZ0 addresses the entire basic connection.

In addition, another telephone TEA is connected to a second network terminal NT2 by means of its own basic ISDN connection.

Figure 2:
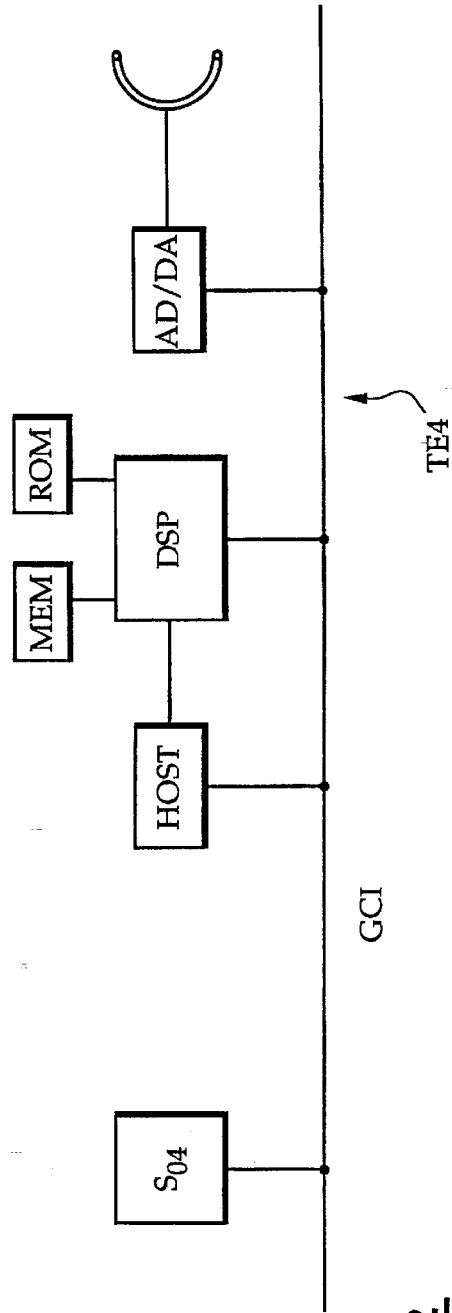
FIG. 2 is a configuration example of the digital telephone of the invention.

FIG. 2 depicts a configuration example of the digital telephone TE4 of the invention. The digital telephone TE4 has an interface $S_{04}$ for connecting the digital telephone TE4 to the $S_0$ bus. It furthermore has a first control means HOST for controlling the functions that can be executed by the digital telephone TE4. The first control means HOST has a direct connection to a digital signal processor DSP. A direct connection links the digital signal processor DSP to a first memory MEM for the recording and playing back of digitalized speech. The first memory MEM can be a commercial DRAM, for example, or an electrically erasable, programmable read-only-memory, a so-called EEPROM (Electrically Erasable and Programmable Read Only Memory), which also means flash EPROM's, which can be erased in blocks. In addition, a second memory ROM is linked to the digital signal processor DSP through a direct connection. This second memory ROM stores program modules.

These program modules, in particular, are able to execute the "automatic operator", "mailbox" or "individual messages" functions described below in connection with FIGS. 4, 5 and 6, respectively. The digital telephone TE4 furthermore has an analog interface with an analog-digital/digital-analog converter AD/DA, to which a headset with a microphone for analog speech input, and a loudspeaker for analog speech output, are connected. The direct connection between the first control means HOST and the digital signal processor DSP makes a direct command transfer and status transfer possible, as well as a message transfer and parameter transfer between these two components. The described components of the digital telephone TE4 are connected to an internal digital bus GCI for the exchange of data. Instead of the internal digital bus GCI, other means can also be used to interlink the components of the digital telephone TE4.

Figure 3:
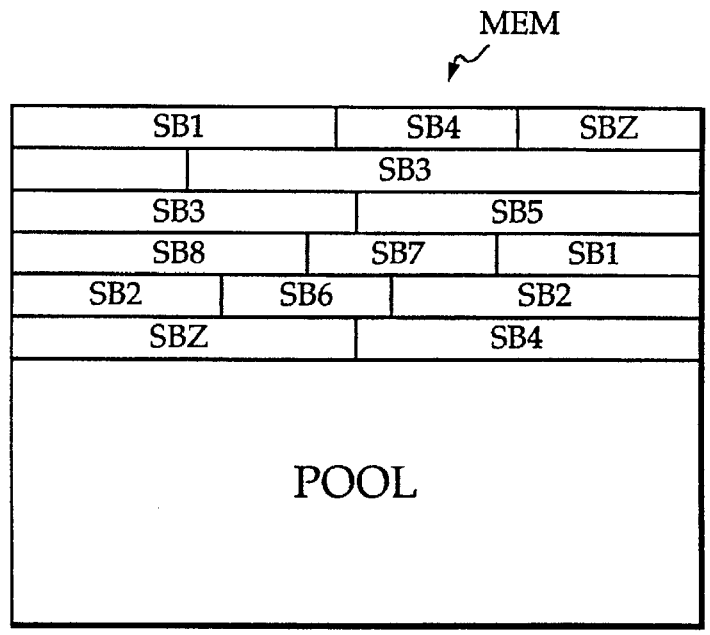
FIG. 3 is a configuration example of a memory for storing speech.

FIG. 3 depicts a configuration example of the first memory MEM. The memory MEM has eight speech areas SB1, ..., SB8, which are respectively assigned to one of the subscriber terminals TE1, ..., TE9. In addition, the memory MEM has a ninth memory area SBZ, which is assigned to several or all the subscriber terminals TE1, ..., TE8. These nine memory areas SB1, ..., SB8, SBZ represent a logical assignment of the memory space that contains speech data from or for the respective subscriber terminal, to the corresponding subscriber terminal TE1, ..., TE8. The memory areas SB1, ..., SB8, SBZ need not necessarily form a physical unit, but can be subdivided into any desired number of partial memory spaces in the first memory MEM. The memory areas SB1, ..., SB8, SBZ have no specified size, rather as much memory space as necessary is occupied. The memory areas contain both announcements or voice messages for transmission to the ISDN communications network, for example to the other telephone TEA, as well as voice messages coming for example from the other telephone TEA, which were transmitted to the digital telephone TE4 via the ISDN communications network.

In addition, the memory MEM contains another area POOL for storing any other kinds of voice messages. Voice messages stored in the memory areas SB1, ..., SB8, SBZ can be assigned to any determinable subscriber numbers.

The following describes three configuration examples for executing the "automatic operator", "mailbox" and "individual messages" functions, which can be executed in particular by means of the digital signal processor DSP and the second memory ROM.

Figure 4:
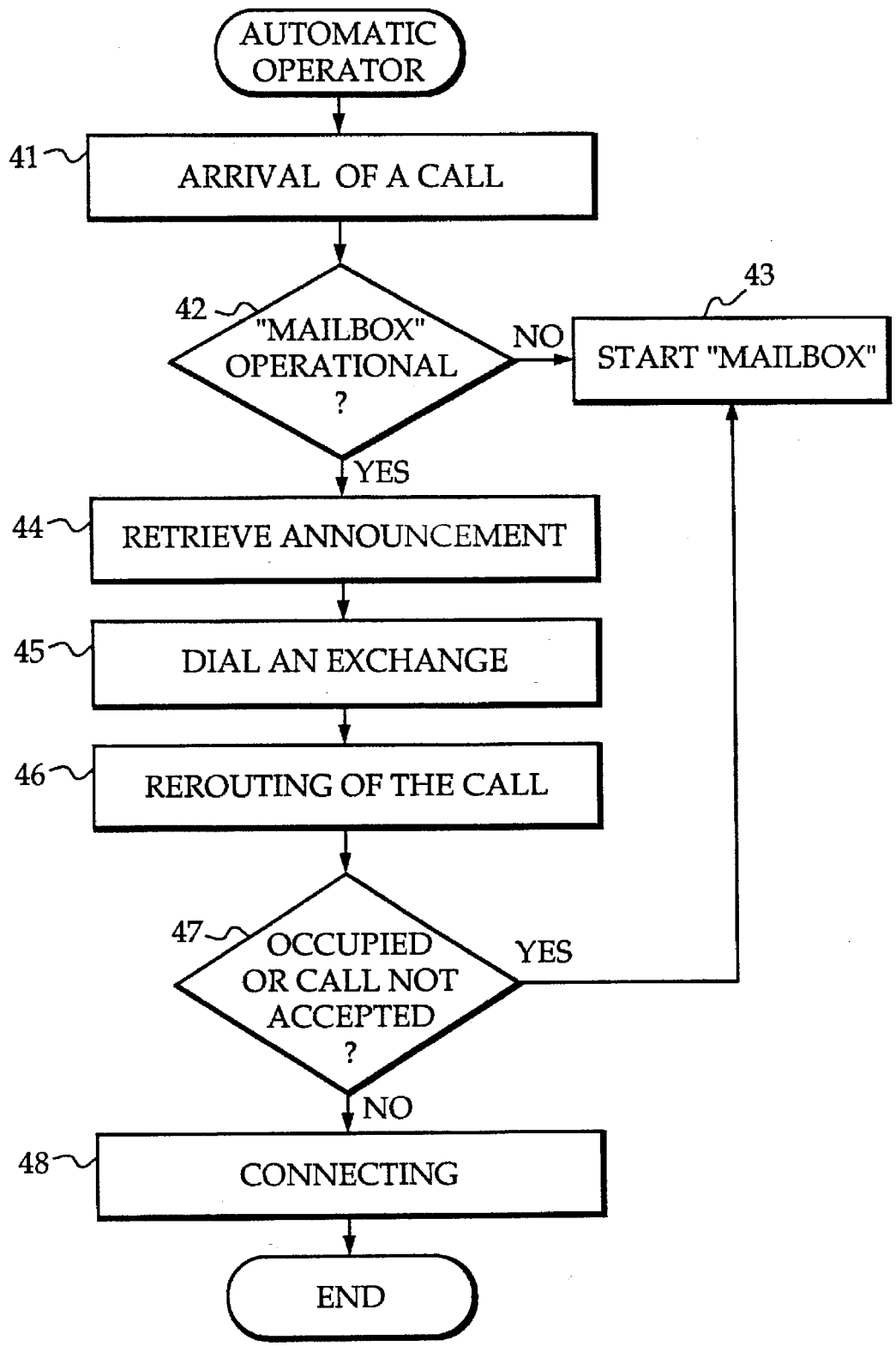
FIG. 4 is a flow diagram of a configuration example of the "automatic operator" function.

FIG. 4 depicts the flow diagram of the configuration example of the "automatic operator" function. In the first step 41, a call from the other telephone TEA in the ISDN communications network arrives at the existing basic connection $S_0$. The entire basic connection was addressed by means of the terminal dial number EAZ0. Step 42 first tests whether a general "mailbox operation" is switched on. Not all subscriber terminals TE1, ..., TE8 of the basic connection are occupied during general "mailbox operation". This can take place at night or during the weekend, for example. If that is the case, step 43 branches off to the "mailbox" function. This "mailbox" function is described further below. If the general "mailbox operation" is switched on, step 44 transmits an announcement to the caller. This announcement is obtained from the memory area SBZ of the first memory MEM. The announcement could have the following words: "Hello. This is the XY Company. If you wish to speak to the Patent Department, please press number 1. If you wish to speak to Sales, please press number 2. Mr. Mueller is at number 3. If you wish to be connected with the central station, please press zero or wait a few seconds after this announcement". In step 45, the desired exchange and the respective number is received and evaluated by the digital telephone TE4 as a DTMF (Dual Tone Multi Frequency) tone. If the other telephone TEA is a telephone that is unable to produce DTMF tones, the end of the announcement is awaited for a subsequent connection with the central station. In step 46, the digital telephone TE4 takes over the automatic switching of the call to the corresponding subscriber terminal TE1, ..., TE8, in accordance with the dialing by the other telephone TEA. The call rerouting feature, which is made available by the ISDN at the basic connection, can be executed in this manner. Step 47 tests whether the dialed subscriber terminal TE1, ..., TE8 is occupied, or whether the rerouted call has not been accepted by the dialed subscriber terminal after a certain specifiable time. If that is the case, the branch of step 43 is again accessed, in which the digital telephone TE4 switches over to the "mailbox" function. If the desired call is accepted, the desired connection is completed in step 48.

Figure 5:
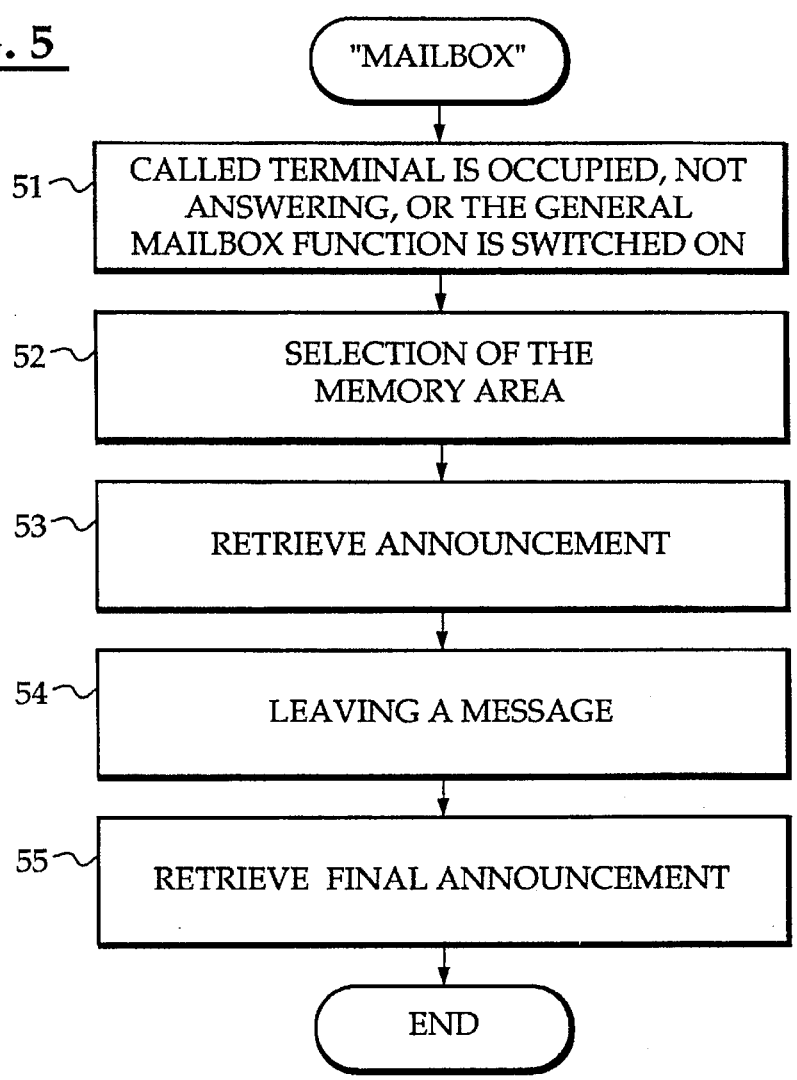
FIG. 5 is a flow diagram of a configuration example of the "mailbox" function.

FIG. 5 depicts the flow diagram of the configuration example of the "mailbox" function. The first step 51 determines that one of the subscriber terminals TE1, ..., TE8, which is connected to the $S_0$ bus, and which receives a call from the other telephone TEA in the ISDN communications network, is occupied, that the call has not been accepted after a certain specifiable time, or that the general "mailbox operation" is switched on. After that, the memory area in the first memory MEM, which is assigned to the called subscriber terminal TE1, ..., TE8, is activated in step 52. This memory area SB1, ..., SB8, SBZ represents the "mailbox" of the respective assigned subscriber terminal TE1, ..., TE8, or the central "mailbox" SBZ for all subscriber terminals. The memory areas SB1, ..., SB8, SBZ are activated by the terminal dial numbers of their assigned subscriber terminals TE1, ..., TE8 and the EAZ0, which addresses the entire basic connection. In step 53, a previously recorded announcement is then read from the selected memory area SB1, ..., SB8, SBZ and transmitted to the other telephone TEA. This announcement corresponds to the usual announcements known from conventional answering systems. However, each user of one of the subscriber terminals TE1, ..., TE8 can individually record his own announcement in the assigned memory area SB1, ..., SB8, SBZ. In step 54, the other telephone then has the possibility of leaving a message for the called subscriber terminal. This message is then stored in the selected memory area SB1, ..., SB8, SBZ, and can be retrieved later. In step 55, a possible final announcement can subsequently be transmitted to the other telephone TEA. This final announcement is also stored in the memory area SB1, ..., SB8, SBZ.

The messages stored in the memory areas SB1, ..., SB8, SBZ must be individually retrievable by the respective user. To that end, each of the memory areas SB1, ..., SB8, SBZ must be equipped with its own security code. Since several users utilize the digital telephone TE4 in the "mailbox" function, the security code must be operative for both remote and direct inquiries. This can occur in two ways. The generally employed method uses a DTMF tone generator, which must receive a number code at a certain point in time. The second method is an identification of the respective user's speech. A useable procedure for identifying speech is described in Patent Application DE-A 42 07 837, corresponding to U.S. patent application Ser. No. 08/387,388, for example. Therefore, a user can only retrieve messages from the memory area SB1, ..., SB8, SBZ if he can identify himself to the digital telephone TE4. To that effect, the digital telephone TE4 contains a comparing means, which in the configuration examples described here is realized by the first control means HOST. An identification code is transmitted to the digital telephone TE4. As stated above, this can be a DTMF tone sequence or speech. The comparing means compares the transmitted identification code with the security code of the respective memory area SB1, ..., SB8, SBZ, and upon a match transmits the retrieved voice message to the corresponding subscriber terminal TE1, ..., TE8. In a similar manner, a security code can be provided for the central memory area SBZ, whereby possibly all users of subscriber terminals TE1, ..., TE8 can gain access to this central memory area SBZ.

Figure 6:
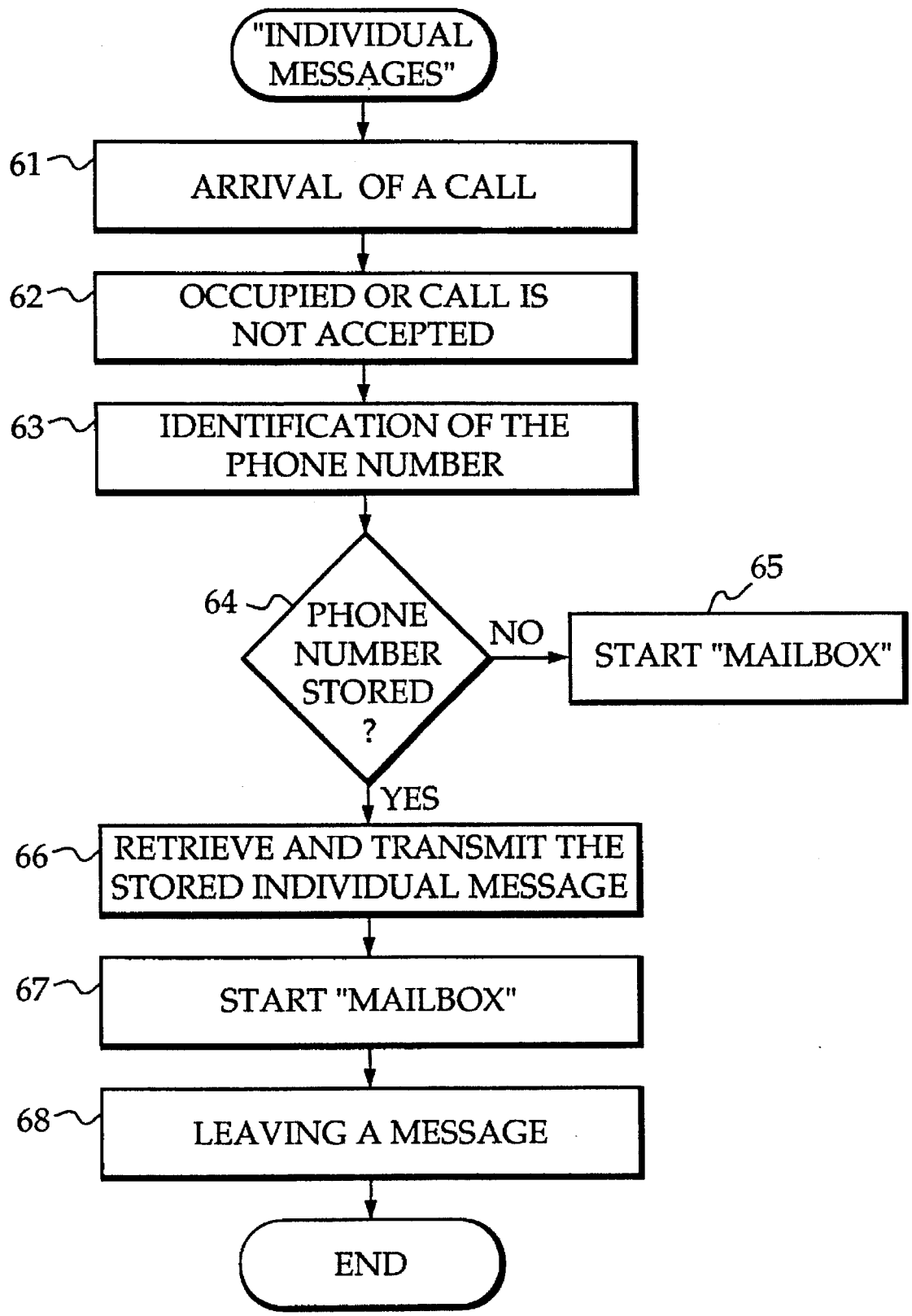
FIG. 6 is a flow diagram of a configuration example of the "individual messages" function.

FIG. 6 depicts the flow diagram of the configuration example of the "individual messages" function. In step 61, the call from the other telephone TEA arrives at one of the subscriber terminals TE1, ..., TE8 of the basic connection. Subsequently step 62 determines that the call was not accepted. It is also possible that the user of a subscriber terminal TE1, ..., TE8 has informed the digital telephone TE4 that he will be absent. In such a case, the telephone number of the other telephone TEA is identified in step 63. It is assumed that this telephone number is signalled to the basic connection when the call is assigned. The user of a subscriber terminal TE1, ..., TE8 has the possibility of directing messages exclusively to one telephone number in the memory area SB1, ..., SB8, SBZ. In step 64 therefore, the identified telephone number of the other telephone TEA is then compared with the telephone numbers to which an individual message has been assigned, and which are stored in the respective memory area SB1, ..., SB8, SBZ. If the identified telephone number does not match the telephone numbers stored in the respective memory area SB1, ..., SB8, SBZ, step 65 then switches over to the already described "mailbox" function. However, if the identified telephone number matches one of the stored telephone numbers, in step 66 the individual message assigned to the telephone number is read out from the corresponding memory area SB1, ..., SB8, SBZ and transmitted to the other telephone TEA. In the present configuration example, the identification of the telephone number of the other telephone TEA, the comparison of the stored telephone numbers with the identified telephone number, and the readout and transmittal of the recorded individual message are carried out by the first control means HOST. It is also possible to perform these steps by means of a specially provided second control means, which is not specified in detail in this instance. After the transmittal of the recorded individual message to the other telephone TEA, step 67 switches over to the "mailbox" function. This gives the other telephone TEA the ability to leave a message, after it has received new information. This potential message is stored in the respective memory area SB1, ..., SB8, SBZ. When the "mailbox" function is executed, a different announcement from the usual greeting message can be used, since the other telephone TEA has already received a message from one of the subscriber terminals TE1, ..., TE8.

The execution of the "mailbox", "automatic operator" and "individual messages" functions described in the configuration examples, by means of the program module stored in the second memory ROM, must not be restricted to the described configurations. Rather, using the digital signal processor DSP and the second memory ROM with the program modules, in combination with the function control of the digital telephone TE4 by means of the first control means HOST, guarantees a particularly flexible and simple execution of the functions. It is left to the specialist to combine the program module with the execution of the "mailbox", "automatic operator" and "individual messages" functions, in any manner.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A digital telephone (TE4) comprising an interface means ($S_{04}$) providing a connection with a link ($S_0$) to a digital communications network (ISDN), said link having at least one further digital telephone (TE1, ..., TE8) connected thereto; a first control means (HOST) connected to such interface means for controlling functions executable with the digital telephone (TE4); a first memory (MEM) for storing speech connected to a digital signal processor (DSP) connected to both said first control means and said interface means; a second memory (ROM); and program modules stored in the second memory (ROM) connected to said digital signal processor, said program modules for executing a first, automatic operator function, in which speech data is read from the first memory (MEM) and transmitted over the digital communications network (ISDN) to another telephone (TEA) having a separate link to the digital communications network (ISDN), and the digital telephone (TE4), in response to signaling information from the other telephone (TEA), initiates establishment of a call from the other telephone (TEA) to the at least one further digital telephone (TE1, ..., TE8), and/or said program modules executing a second, mailbox function, for both the digital telephone (TE4) and the at least one further digital telephone (TE1, ..., TE8).

2. A digital telephone as claimed in claim 1, wherein by means of the program modules stored in the second memory (ROM), a third, individual messages function, for transmitting to the other telephone messages stored in the first memory exclusively for the other telephone.

3. A digital telephone as claimed in claim 1, wherein the first memory (MEM) has a plurality of areas (SB1, ..., SB8, SBZ), wherein one of the areas (SB1, ..., SB8, SBZ) is exclusively assigned to the at least one further digital telephone (TE1, ..., TE8), and/or wherein one of the areas (SB1, ..., SB8, SBZ) is assigned to both the digital telephone (TE4) and the at least one further digital telephone (TE1, ..., TE8).

4. A digital telephone as claimed in claim 3, wherein one of the areas (SB1, ..., SB8, SBZ) is provided with a security code, and wherein the digital telephone (TE4) includes a comparing means for comparing said security code with an identification code transmitted to the digital telephone (TE4), so that the voice messages received from the other telephone (TEA) and stored in said area (SB1, ..., SB8, SBZ) are retrievable only when the comparing means detects agreement between the security code and the identification code.

5. A digital telephone as claimed in claim 2, wherein it includes a second control means for identifying a directory number of the other telephone (TEA), for comparing said directory number with directory numbers stored in the first memory (MEM) and each having assigned to it a message stored in the first memory (MEM), and in case of agreement for causing the message stored at the directory number of the other telephone (TEA) to be transmitted from the first memory (MEM) to the other telephone.

6. A digital telephone as claimed in claim 1, wherein the interface means ($S_{04}$) is an $S_0$ interface for connecting the digital telephone (TE4) to an $S_0$ bus of an integrated services digital network (ISDN).

7. A digital telephone as claimed in claim 2, wherein the first memory (MEM) has a plurality of areas (SB1, ..., SB8, SBZ), wherein one of the areas (SB1, ..., SB8, SBZ) is exclusively assigned to the at least one further digital telephone (TE1, ..., TE8), and/or wherein one of the areas (SB1, ..., SB8, SBZ) is assigned to both the digital telephone (TE4) and the at least one further digital telephone (TE1, ..., TE8).

* * * * *